United States Patent [19]

Ingalls, deceased et al.

[11] 4,385,422
[45] May 31, 1983

[54] CRAYFISH PEELER

[75] Inventors: Edgar J. Ingalls, deceased, late of Baton Rouge, La., by Lou Ellen S. Ingalls, Edith I. Hodgeson, Ellen I. Guidry, heirs; Eddie J. Guidry, Baton Rough, La.

[73] Assignee: Duzitall Equipment Corporation, Baton Rouge, La.

[21] Appl. No.: 244,954

[22] Filed: Mar. 18, 1981

[51] Int. Cl.³ .............................................. A22C 29/02
[52] U.S. Cl. ........................................... 17/73; 17/48
[58] Field of Search ................................ 17/73, 48, 51

[56] References Cited

U.S. PATENT DOCUMENTS 3,221,363 12/1965 Couret .................................. 17/73 X
3,758,921 9/1973 Ingalls ................................. 17/73 X
3,789,460 2/1974 Ingalls ...................................... 17/73

Primary Examiner—Willie G. Abercrombie
Attorney, Agent, or Firm—Roy, Kiesel, Patterson & McKay

[57] ABSTRACT

An improved apparatus for deheading and peeling crayfish comprising pairs of gripper assemblies for operative engagement with the head and tail sections of a crayfish, respectively, supported for movement in synchronized relation through separate but tangentially related orbits wherein the pairs of grippers simultaneously move in a common direction through or past the point of tangency of their respective orbits wherein the tail holding gripper assemblies each comprise a lower crayfish pan constructed from flexible rubber or plastic member having an arcuate cross section greater than 180° and a top arm member pivotly mounted above the lower pan to hold the crayfish in the pan during the deheading cycle, the pivoting of top arm member being actuated by a simplified cam assembly.

8 Claims, 4 Drawing Figures

CRAYFISH PEELER

BACKGROUND OF THE INVENTION

1. Field of the Invention

This invention relates to an improved device for automatically deheading and removing the edible meat from the shells of crayfish, shrimp and certain other crustaceans.

2. Prior Art

This invention is an improvement of those crayfish peelers disclosed in Ingalls U.S. Pat. No. 3,758,921, issued Sept. 18, 1973, and entitled "Crayfish Peeler", and in Ingalls U.S. Pat. No. 3,789,460, issued Feb. 4, 1974, and entitled "Crayfish Peeler". While these prior art devices were effective in removing the edible meat from crayfish, they were not as efficient in either removing all of the edible meat or their mechanical configuration would not allow them to process as many crayfish per unit time as desired. Furthermore, their complexity made them more subject to mechanical failure. Still further, they were not designed to easily handle the multiple sizes of crayfish processed.

SUMMARY OF THE INVENTION

Therefore, it is an object of this invention to provide a mechanically simpler device for deheading and removing the edible meat from crustaceans, such as crayfish and shrimp.

Another object of this invention is to provide a device capable of processing almost any size crayfish or shrimp.

Still another object of this invention is to provide a device that can process more crayfish or shrimp per unit time.

Other objects and advantages of this invention will become apparent from the ensuing descriptions of the invention.

Accordingly, a device for deheading and removing the edible meat from the body of crayfish, shrimp and similar crustaceans is provided comprising a head rotor assembly and tail rotor assembly for acting on the head section and tail section, respectively, of the crustacean, each rotor assembly having an equal number of gripper assemblies circularly mounted on plate members in operationally cooperative positions, each head gripper assembly comprising a concave flexible holder having an arcuate cross section greater than 180°, a top head plate pivotly mounted on a support means wherein one end of the head plate is pivotable into the flexible holder, and a pivot accuating member attached to the head plate and in operative contact with a cam rotatably mounted in the center of the gripper assembly, a meat rejection assembly comprising metal air tubes rigidly positioned in the flexible holder and provided with a sharp pointed end for impaling the crayfish tail when it is positioned in the flexible holder.

PREFERRED EMBODIMENTS OF THE INVENTION

Figure 1:
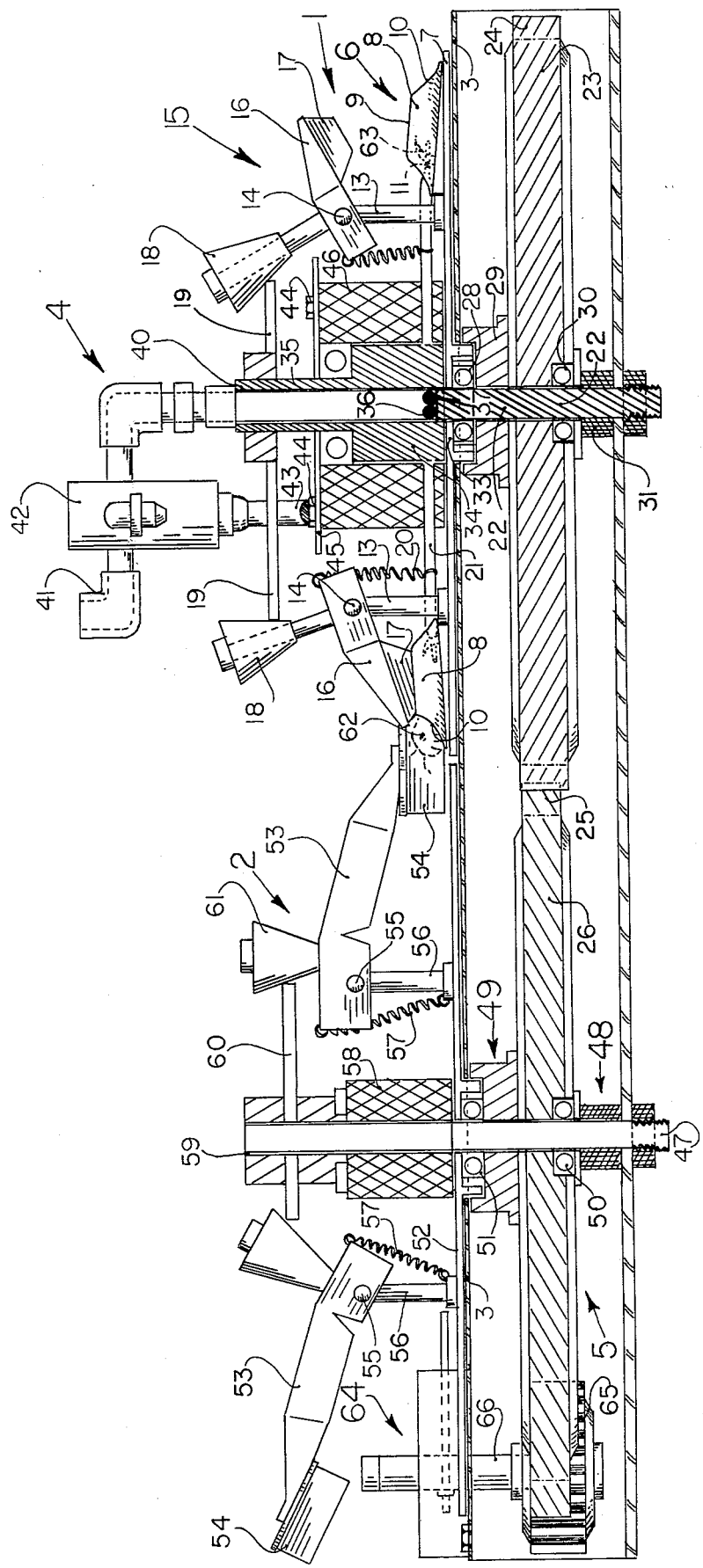
FIG. 1 is a three dimensional cutaway side view of a preferred embodiment of this invention.

Referring now to the Figures, a preferred embodiment of a crayfish deheader/peeler is illustrated, which comprises a body gripper assembly, denoted generally by the number 1, and head gripper assembly, denoted generally by the number 2, both being mounted on a top platform base 3, an air discharge assembly, denoted generally by the numeral 4, and a drive means, denoted generally by the numeral 5.

Body gripper assembly 1 comprises multiple crayfish body holders 6 equally fixedly spaced about the perimeter of rotating metal disc 7 and with the elongated sidewalls 8 perpendicular to the perimeter. Each body holder 6 is preferably constructed from flexible material, such as plastic or rubber, whose sidewalls 8 form an arc greater than 180°, but less than 300°. In this configuration, crayfish of varied sizes can be forced through opening 9 and securely held in proper position by the squeezing pressure of sidewalls 8. In a more preferred embodiment, sidewalls 8 are sloped downward from the center area 9 at both ends 10 and 11 in order to facilitate the loading of the crayfish into holder cavities 12.

Mounted on rod 13 in a pivoting relationship by pin 14 are body gripper means 15. Each gripper means comprises an extension arm 16 having a gripper pad 17 that extends into opening 9 when extension arm 16 is pivoted downward about pin 14. Each gripper means also comprises a cam actuatable member 18 attached to extension arm 16 so as to force gripper pad 17 into opening 9 when cam 19 contacts member 18. To keep gripper pad 17 free from opening 9 until forced into it by the cam movement, spring 20 is attached at one end to extension arm 16 and to air blower duct 21 at its opposite end as shown in FIG. 1.

Metal disc 7 is rotatably attached to drive shaft 22 connected to gear 23 having gear teeth 24, which mesh with gear teeth 25 of gear 26 which is drivingly connected by gear 65, which, in turn, is drivingly contacted by a motor or other drive means (not shown). Shaft 22 is conventionally held in perpendicular relationship to disc 7 by bearings, 28, shaft collar 29, lower bearings 30, and lower shaft collar 31 positioned between top platform base 3 and bottom platform base 32 as shown in FIG. 1.

Figure 4:
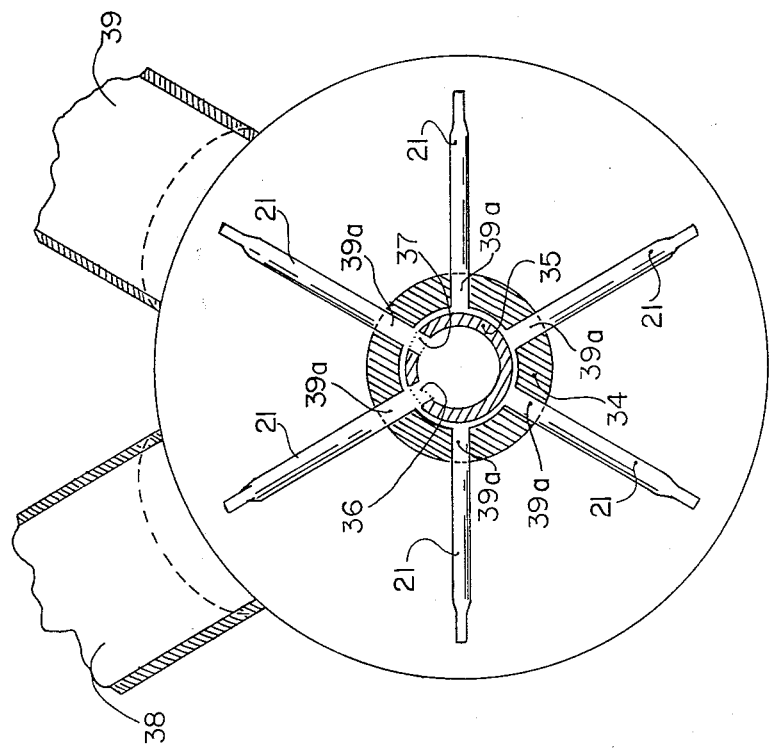
FIG. 4 is a cross sectional view taken along lines 4—4 of FIG. 2.
Figure 3:
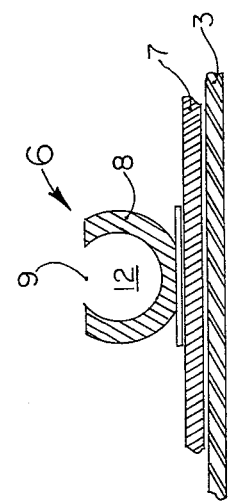
FIG. 3 is a cross sectional view taken along lines 3—3 of FIG. 2.

Resting on bearings 28 is metal washer 33 on which fits collar 34 through which stationary hollow tube 35 fits parallel with solid shaft 22. As seen in FIG. 4, hollow tube 35 is provided with two openings 36 and 37 that are positioned at the same level as air blower ducts 21, which, when aligned with collar openings 39A, open into meat discharge duct 38 and shell discharge duct 39.

Cam 19 comprises in a preferred embodiment a semi-circular ring fixedly mounted on non-rotating shoulder member 40 of collar 34 and is positioned at a height to strike and force downward cam actuatable members 18 as they rotate about collar 34.

Air discharge assembly 4 comprises air tubing 41 connected at one end to an air source (not shown) and at its opposite end to tube 35. Air flow regulator valve 42 is provided with activating switch 43 which allows pressurized air to flow through valve 42 when switch 43 is pushed upward by shoulder sections 44 extending above circular plate 45 mounted on cylinder 46. Cylinder 46 is fixedly attached to plate 7 so that it revolves as plate 7 revolves about axle 22. Each shoulder section is mounted directly above air blower duct 21 so that as ducts 21 become aligned with openings 36 and 37, air is discharged through valve 42.

Head gripper assembly 2 is similarly constructed like body gripper assembly 1, except that there is no air discharge assembly or body holders. More particularly, gear 26 is mounted on axle 47 vertically fixed between top platform base 3 and bottom platform base 32 by conventional collar bearing assemblies 48 and 49, having collar bearings 50 and 51, respectively.

Metal disc 52 is mounted to assembly 49 so as to cause rotation about axle 47. Then mounted on disc 52 are head gripper assemblies 2, which preferably equal in number the body gripper assemblies 1 and are positioned equally apart about the perimeter of disc 52 to coordinate their simultaneous arrival at the point of tangency of both discs 7 and 52 as these discs rotate.

Each head gripper assembly comprises an extension arm 53 having a gripper pad 54 that will extend over the end 10 of sidewalls 8 when the gripper assemblies 1 and 2 are at the point of tangency. As in the body gripper assembly, extension arm 53 is pivotedly mounted by pin 55 on vertical rod 56 and maintained in proper position by springs 57.

Mounted on bearing 51 in a non-rotating fashion is cam sleeve 58 and tubing 59 fixed in center cavity of sleeve 58. Attached to tubing 59 is cam member 60 which is designed to contact head gripper actuator 61 to force pad 54 downward.

Figure 2:
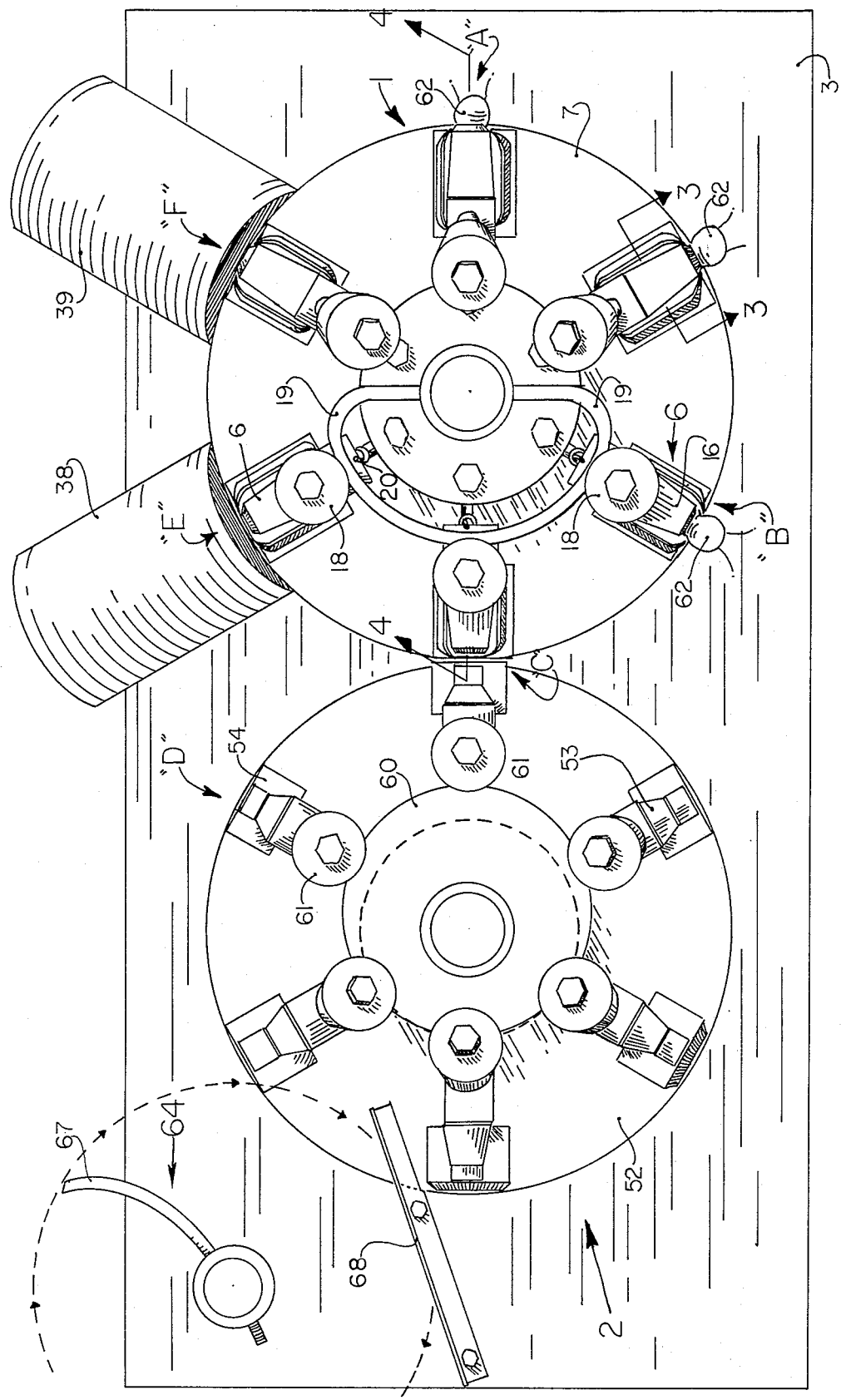
FIG. 2 is a three dimensional top view of a preferred embodiment of this invention.

In operation, a crawfish 62 is placed by hand, with its dorsal side down and with its tail section preferably stuck to metal pin 63 located in holder cavity 12. This is preferably done at location "A" shown in FIG. 2. As disc 7 rotates so that body holder 6 moves to location "B", cam 19 contacts actuator member 18, forcing extension 16 and gripping pad 17 downward to firmly hold crawfish 62 in body holder 6. Simultaneously, disc 52 moves in a common direction so that a pair of body and head grippers pass by the point of tangency (location "C") in synchronized relation. When a head gripper assembly 2 reaches location "C", cam 60 contacts actuator 61, forcing gripping pad 54 to press against the extending head of the crawfish. As discs 7 and 52 continue past location "C", the head is torn from the body and remains pressed against plate 52 by gripper pad 54, until it reaches location "D", at which time spring 57 forces extension arm 53 to raise gripper pad 54 because cam 60 no longer is in contact with cam actuator 61.

Now, when body gripper assembly 1 reaches location "E", valve 42 is activated allowing pressurized air to flow down tube 35 and out openings 36 and 37. The air flowing through opening 36 continues through duct 21 and ultimately into the crawfish shell. The pressure is regulated so that the meat is blown into meat discharge duct 38. The crawfish shell is prevented from being blown into duct 38 by gripper pad 17, which is held down by cam 19. However, as disc 7 continues to rotate so that actuator member 18 no longer contacts cam 19, spring 20 forces gripper pad 17 upward. Now, when body gripper assembly 1 reaches location "F" directly opposite shell discharge duct 39, air passing through opening 37 will blow the empty crayfish shell into duct 39.

Returning now to the processing of the removed crayfish heads, a head sweeping assembly 64 is provided to remove the crayfish heads from platform base 3. Assembly 64 comprises, in a preferred embodiment, a third gear 65 which meshes with gear 26 which is mounted on axle 66 as seen in FIG. 1. Mounted on axle 66 above platform base 3 is a flexible sweeping arm 67 of sufficient length to contact the crayfish heads lying on disc 52. As arm 67 rotates, it forces the crayfish heads against metal plate 68, which directs the crayfish heads off of base 3. More preferably, plate 60 will have an arcuate vertical surface having a radius of curvature identical to that formed by arm 67 as it rotates about axle 66.

There are, of course, other obvious embodiments not specifically described or illustrated, but which are intended to be included within the scope of this invention as defined by the following claims.

What I claim is:

1. An apparatus for deheading and removable of edible meat from crayfish and similar crustaceans which comprises:
   (a) a body gripper assembly rotatably mounted on a substantially flat platform base, said body gripper assembly comprising:
      (i) body holder means, each having top holder means pivotly mounted to a vertical support member and extending over a bottom body holder means, each of said top body holder means having a cam accuateable member extending vertically upward, and
      (ii) a body cam positionly mounted to an air discharge assembly in the center of said body holder means and shaped to accuatingly contact said cam accuateable member;
   (b) a head gripper assembly rotatably mounted on a second substantially flat platform base and supported for movement in synchronized relation with said body gripper assembly through separate but tangentially related orbits wherein said gripper assemblies simultaneously move in a common direction through the point of tangency of their respective orbits, said head gripper assembly comprising
      (i) multiple head holder means equally spaced about the perimeter of said head gripper assembly, each head holder means having a top head holder pivotedly mounted on a vertical head holder support member attached to a plate support and extending over said point of tangency when directly opposite one of said body holder means, each of said head holder means having a head cam member accuateably extending vertically upward, and
      (ii) a head cam rotatably mounted in the center of said head holder means and shaped to accuatingly contact said head cam accuateable member at said point of tangency;
   (c) said air discharge assembly having one opening of an air duct extending over each of said bottom body holders, the other end of said ducts are openable through two spaced apart openings in a main duct connected to a pressure air source; and
   (d) a drive means connected to said body gripper assembly and to said head gripper assembly to cause them to rotate.

2. An apparatus according to claim 1 wherein said bottom body holder means comprises a tubularly shaped flexible member whose side walls form an arc greater than 180°, but less than 300° and whose open ends are perpendicularly positioned to the perimeter of said base.

3. An apparatus according to claim 2 wherein said side walls are sloped downward from the center of said flexible member to each of its ends.

4. An apparatus according to claim 2 wherein said top body holder means comprises a hard, but slightly flexible, pad extending downward over said flexible member and wherein said pad comprises a bottom shoulder section shaped to fit between said side walls.

5. An apparatus according to claim 1 wherein a spring is attached at one end of each top body holder means at a position behind said vertical support member, and attached at its other end to one of said air ducts.

6. An apparatus according to claim 1 wherein a spring is attached at one end of each head holder means at a position behind said vertical head holder support member, and attached at its other end to said plate support.

7. An apparatus according to claim 1 wherein a head sweeper assembly attached to said platform base comprises a sweeper arm rotatably mounted on a shaft attached to said drive means and wherein said sweeper arm extends onto and in contact with said plate support past said head gripper, and wherein a guide wall is fixedly mounted to said platform base to receive the crustacean heads swept by said sweeper arm.

8. An apparatus according to claim 7 wherein said guide wall has a vertical concave shaped flat surface whose arc coincides with the arc formed by said sweeper arm and wherein said flat surface is positioned adjacent said sweeper arm arc.

* * * * *